Jan. 3, 1956 W. F. COUSINO 2,729,229
AUTOMATIC BLOW-OFF FOR PRESSURE TANKS
Filed Sept. 12, 1950 3 Sheets-Sheet 1
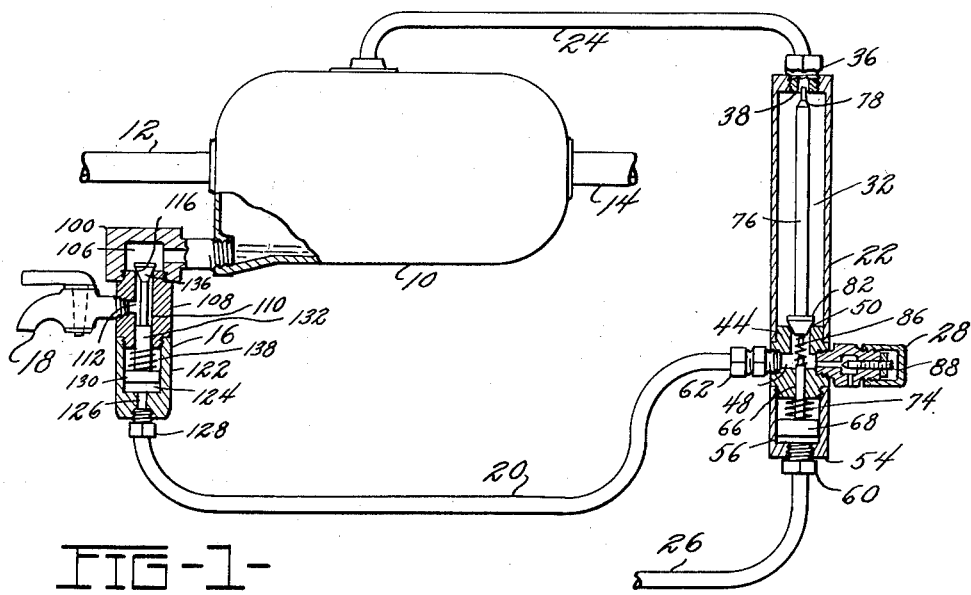
Inventor:
WALTER F. COUSINO.
By Wm. Q. Ballard
Attorney

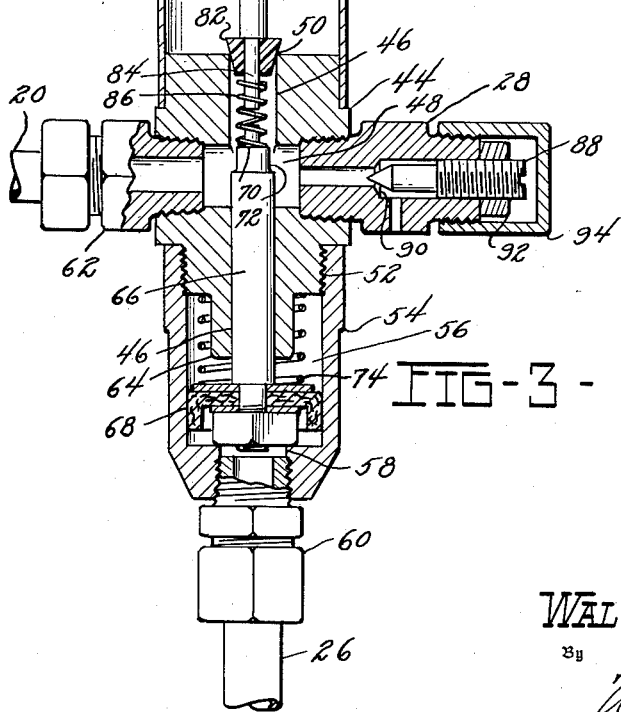

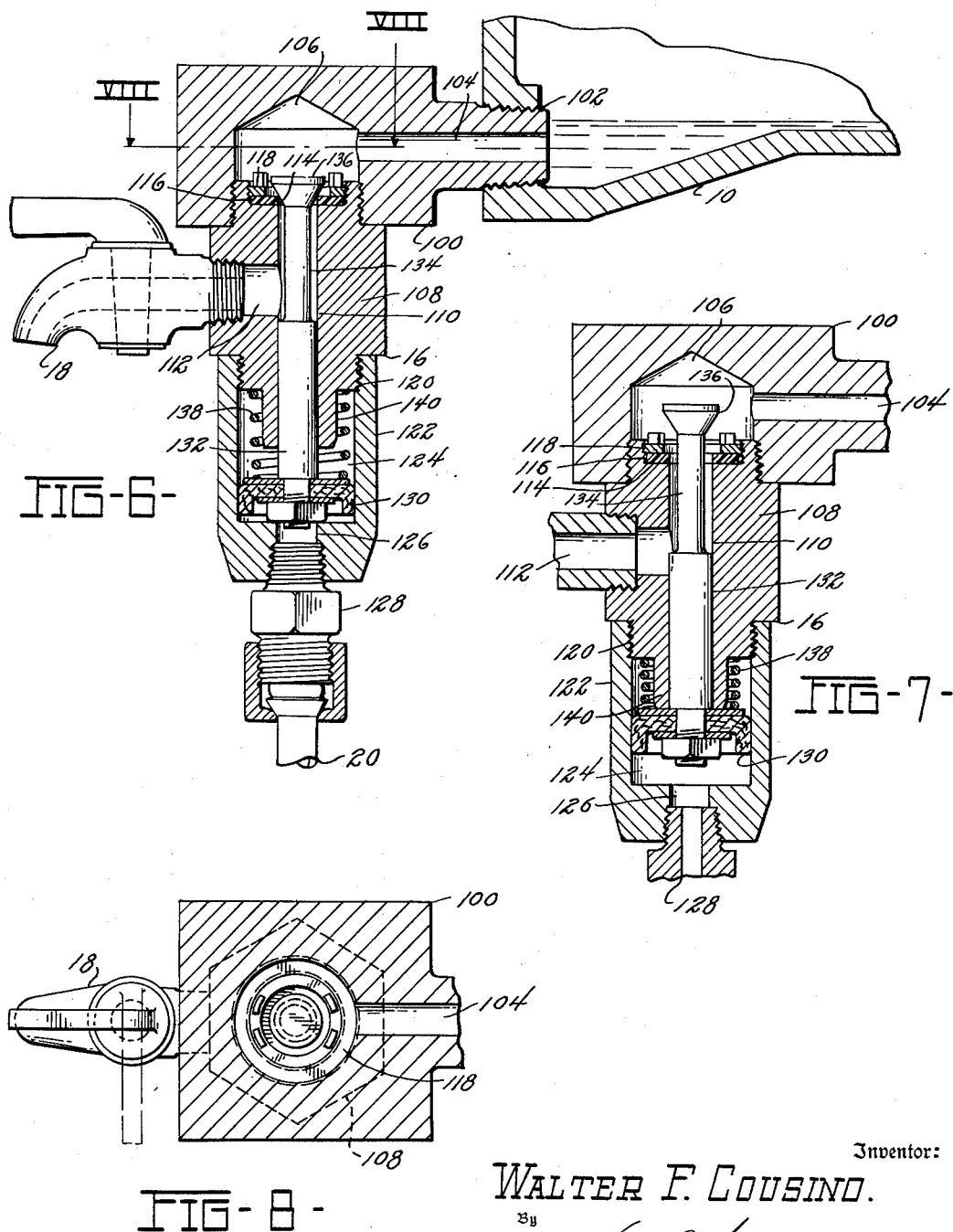

United States Patent Office 2,729,229
Patented Jan. 3, 1956

2,729,229

AUTOMATIC BLOW-OFF FOR PRESSURE TANKS

Walter Frank Cousino, Toledo, Ohio, assignor of one-third to Jackson H. Rollins, and one-third to Harry M. Turner, both of Toledo, Ohio Application September 12, 1950, Serial No. 184,371

9 Claims. (Cl. 137—204)

This invention relates to automatic blow-off equipment for pressure tanks.

An object of this invention is to provide an automatic blow-off valve for a pressure tank in which the valve operates to open against the pressure within the tank.

Another object of this invention is to provide a control for the valve operated by the pressure within the tank, which in turn, is controlled by an interconnection with a service device operated by the pressure.

Another object of this invention is to provide simple and effective manually as well as automatically operated means which defeats any substantial loss of pressure in the operating system, in the event there is any failure of complete operation within the blow-off control. This is a safety factor of vital importance in vehicles.

Another object of this invention is to provide a blow-off for a pressure tank, which in its operation does not affect the normal operation of the services supplied from the tank nor their controls.

And another object of this invention is to provide a relay or actuator for the system, of efficient design and operation, capable of accurate and easy adjustment and having a positive control action under all conditions of operation.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Referring to the drawings:

Fig. 1 is a diagrammatic showing of the system depicting the automatic blow-off moisture control, the parts being shown in normal or closed positions;

Fig. 2 is a diagrammatic showing of the system of Fig. 1, the parts being shown at blow-off positions;

Fig. 3 is a longitudinal section through the actuator or relay unit for the system of Fig. 1;

Fig. 4 is a view on the line IV—IV, Fig. 3;

Fig. 5 is a view on the line V—V, Fig. 3;

Fig. 6 is a longitudinal section through the discharge valve unit in the system shown in Fig. 1, the parts being shown in valve closed positions;

Fig. 7 is a view similar to Fig. 6, with the parts therein shown in their open positions; and Fig. 8 is a view on the line VIII—VIII, Fig. 6.

There is herein disclosed a preferred construction of the control for the blow-off from pressure systems particularly adapted for use on trucks, bus and trolley coaches and the like, which is entirely automatic in operation, within satisfactory original and maintenance costs and which keeps the pressure clear of water, oil and sludge or other undesirable accumulations, by periodic discharges from the tank timed with each use of the connected services.

The system

Fluid medium pressure tank 10 is supplied through line 12 from a source of supply such as a compressor while the pressure to the service units S is delivered from the tank by way of outlet duct 14 therefrom.

In operation, water, oil and sludge tend to collect within the tank 10 and means for repeatedly discharging these undesirable accumulations are provided in the form of a valve device 16 located at a lower region of the tank. The discharge passing through this valve 16 is delivered to atmosphere through a manually operable pet-cock 18.

A duct 20 is connected to the valve 16 to deliver operating pressure to the valve mechanism therein, which line extends from an actuator or relay 22. The relay 22 has a duct connection 24 directly with the tank 10, and another duct connection 26 with a governor unloading head line or direct to a foot or hand control brake or other service valve within the service S. The relay is also provided with an adjustable needle valve timer mechanism 28. The pressure delivered from the relay to the duct 20 is determined and controlled, and is the result of a coaction of pressures operating upon the relay mechanism as flowing through ducts 24, 26 and the timer 28.

The actuator or relay

The relay unit 22 comprises a tubular member 30, herein shown as a cylinder providing a reservoir 32 of predetermined capacity. At one end thereof a head 34 provides a mount for a first fitting 36 threaded thereinto, which fitting provides an inlet valve seat 38 about the axis of the cylinder on the interior thereof. The fitting 36 has an outward extension 40, to which the duct 24 may be coupled by some suitable pipe-joint construction. The fitting 36 is also provided with a removable fluid straining screen 42 mounted therein and ready accessible for periodic cleaning by the service mechanic.

The cylinder end remote from the fitting 36 mounts a closure head or second fitting 44 having an axial way 46 therethrough intersected by a radial way 48. The perimeter about the inner terminus of the way 46 provides an outlet valve seat 50.

The second fitting 44 is provided with an outwardly extending threaded portion 52 mounting a cup-shaped element 54, having its interior finished to form a cylinder 56 which has inlet port 58 from fitting 60 coupling the duct 26 thereto.

The duct 20 is connected to one end of the passage-way 48 by a suitable coupling 62.

The fitting 44 is also provided with an outer boss 64 which provides a desirable linear extent for the way 46 from the way 48 to the outer terminal of the fitting, to form a suitable bearing for piston rod 66 which has one end fixed with the piston 68 within the cylinder 56, and its other end having terminal reduced diameter portions 70, 72, adjacent the way 46 between the way 48 and the valve seat 50.

A helical spring 74 about the boss 64 normally engages the piston 68 to urge the same toward the port 58.

Axially disposed within the reservoir 32, is a reciprocable valve stem 76 having a valve portion 78 on one end designed to cooperate with the inlet valve seat 38. A stem extension 80 from the valve portion extends into the inlet fitting 36 to serve as a valve position retainer. The opposite end of the stem 76 mounts a valve 82 to cooperate with the outlet valve seat 50. A stem extension 84 projects beyond this latter valve into the way 46. The stem 76, common to both valves, is dimensioned so that when the inlet valve 38, 78, is open, the outlet valve 50, 82, is closed and vice versa. At rest, the parts are disposed as shown in Fig. 3, and in this status of parts, spring connector 86 between the stem 76 and piston rod 66 is loosely held in position by encircling the stem etxension 84 and the reduced terminus 70 of the piston rod 66. This permits the pressure from duct 24 to hold the outlet valve 50, 82, fully closed with the spring 86 offering no resistance thereto.

When the pressure medium is delivered to duct 26, the piston 68 is shifted toward the fitting 44, this causes piston rod 66 to move toward the stem 76. The spring 86 is compressed and in turn forces the valve 50, 82, to open (valve 38, 78, simultaneously closing). This spring 86 serves as a shock absorber so there is no actual hammer engagement between the stem 84 and piston rod portion 70. In fact, the spring 86 may be so designed and the distance between the parts 84 and 70 fixed, so that there is no actual contact of these parts and the shifting movement of the piston rod is transferred entirely through the spring 86.

The isolated pressure charge within the reservoir 32 will now flow through way 46 into way 48 and thence to duct 20. However, a predetermined fraction of the charge is bled to atmosphere by way of the needle valve timer mechanism 28 which is also connected into the way 48. This mechanism 28 may be adjusted to control the bleeding by means of screw 88 varying the capacity of its discharge through outlet 90. This screw 88 may be locked in adjusted position by nut 92 and protected from casual tampering by a cap-nut 94.

The detailed operation and function of this valve and the relay as a whole will be described hereinafter under the description of the operation of the system as a whole.

The discharge valve

In manually controlled discharge, the pet-cock 18 is usually mounted directly on the tank 10 in a position to blow-off the collected water, oil and sludge, whenever the pet-cock 18 is opened. Herein, the blow-off valve mechanism 16 is disposed between the tank 10 and the pet-cock 18 and this pet-cock is normally in opened position.

The mechanism 16 embodies a fitting 100 mounted on the tank 10 in the opening 102 usually mounting the pet-cock 18. This fitting has a duct 104 extending into chamber 106 therein. A second fitting 108 is threaded into the fitting 100 to have its axial duct or way 110 in communication with the chamber 106. This way provides a connection from the chamber 106 to lateral outlet 112 to the pet-cock 18.

The chamber terminus of the way 110 provides a seat 114 for a valve seat forming washer 116 held in position by a threaded ring 118. This permits a ready replacement of the valve seat 116 from time to time. This washer is of nylon or a like composition as is, when possible, the other valve parts within the system, which material effectively resists the wear and abrasion usually encountered in devices of the class herein disclosed.

The fitting 108 has threaded extension 120 mounting a cup-shaped element 122 providing a cylinder 124. This element 122 has terminal port 126 for receiving a fitting 128 operatively connecting the cylinder 124 to the duct 20.

A piston 130 is reciprocable within the cylinder 124 and has piston rod 132 extending therefrom through a portion of the way 110 serving as a bearing therefor. Along the way 110, between the seat 114 and outlet 112, the piston rod has reduced diameter portion 134 mounting valve 136 in cooperating position as to the valve seat 116. A spring 138 is disposed between the extension 120 and the piston and partially positioned about boss 140 from the extension 120. This spring normally urged the piston toward the port 126 to hold valve 116, 136, closed.

It will be noted that when pressure enteres the cylinder 124 from the duct 20, the piston will cause the valve 116, 136, to open, even when the pressure in line 20 is the same as in the tank 10, due to the much larger diameter of the piston in relation to the valve element 136.

Operation

Whenever a service valve is manipulated to control some device, as for example, a set of vehicle brakes, pressure is simultaneously supplied into the duct 26.

Prior to each service valve operation, the reservoir 32 has been charged with a pressure equal to that in the tank 10, as the connecting valve 38, 78, between the reservoir and the duct 24 was open, while the outlet valve 50, 82, was closed.

Now when the same pressure also flows through duct 26, the piston 68, having a multiple area of the valves, opens valve 50, 82, and this valve having a common stem with the valve 38, 78, closes this latter valve. Momentarily, the reservoir 32 contains an isolated pressure charge which immediately flows into duct 20 and the connected bleed 28. The bleed 28 having its capacity adjusted to less than the entire discharge from the reservoir, a major pulse acts against the piston 130 in the discharge valve unit to cause said valve to open, allowing a blast or split of discharge from the tank 10 to carry any accumulation therefrom out through the pet-cock 18.

In the meantime, the continuing exhaust by the bleed 28 has permitted the pressure in the duct 20 and reservoir 32 to be reduced to atmospheric. The pressure in the tank 10 then closes valves 136 and 50, 82, and the reservoir will be recharged for the next operation.

While this discharge is usually of explosvie duration, it is sufficient to maintain a clean supply tank without drawing too much pressure therefrom to affect the service.

In the event, an operator notices any fall in service pressure which could be due to any failure in this system, it is only necessary to close the pet-cock 18 to cut out the entire system to defeat any serious loss of service pressure therethrough.

An important feature of this invention, particularly in meeting commercial demands, is the production of the outlet and relay units assembled in a factory delivered package, requiring only a minimum of simple connections to install this automatic blow-off as an accessory with the fluid pressure tank already in service in brake operating or the like equipment using compressed air, such as spray equipment, sand blasting, etc.

The blow-off point may be fixed by selection of a spring 74 having a predetermined compression. The resistance of this spring 74 against movement of the piston 68 affects its operation in a ratio which may be calculated by including the diameter of the piston, the pressures involved and the dimensions of the valves to be operated.

This permits some by-passing or leakage of pressure into the line 26 from a service which would not always cause the relay to be operated, and the selected compression of spring 74 determines the minimum pressure necessary to initiate the blow-off cycle.

In other words, when the service operates with great frequency and small increments of pressure, such as slight applications of a brake, it is not necessary nor desirable to operate the blow-off with each slight service operation. The selected spring compression fixes a predetermined blow-off operation point and this may be varied by a change of springs.

The physical construction and assembly of the relay allows one skilled with such devices to readily replace the spring, yet protects the same from a too easy approach.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed and is desired to secure by United States Letters Patent:

1. In combination with a fluid pressure supply system including a tank, a blow-off for said tank including a first valve adapted to be opened against the pressure in said tank, a manually controllable discharge valve for the flow from the opened first valve, and a first piston and cylinder operator for opening said first valve including a pressure duct to said cylinder; a relay for a predetermined control of pressure into said duct, said relay including a second piston and cylinder operator having duct connections from said tank and from a service control device operated by the pressure from said tank, and valve means in said relay operable by said second piston and cylinder operator in response to said service control device to control pressure flow from said tank to said first piston and cylinder operator in response to its operation as effected by operating pressure from the service control device.

2. The system set forth in claim 1 wherein said relay is provided with an adjustable exhaust in communication with the duct to the blow-off valve operating cylinder, said exhaust additionally effecting the operation of said cylinder.

3. A relay for controlling the operation of a blow-off device for a fluid pressure tank comprising a reservoir having an inlet and an outlet, mechanism including an axial stem having differential heads on opposite ends thereof, said heads serving as a pair of valves for said inlet and outlet and adapted to alternately open either the inlet or outlet while simultaneously closing the other, a pressure providing duct to said inlet providing pressure within said reservoir to operate against the outlet valve for normally holding said valve mechanism open at the inlet and closed at the outlet to provide a store of pressure fluid in said reservoir, a pressure operated device operable to reverse said valves, said device including a spring connection between said device and said axial stem, and a branch duct between said relay and blow-off device connected to said relay to receive the reservoir stored pressure when the outlet valve is open and conduct the same to said blow-off device as an operating medium therefor.

4. The relay construction set forth in claim 3 including an adjustable bleed from the relay in direct communication with said branch duct.

5. A valve actuator of the class described including a tubular element providing a reservoir, a first closure fitting at one end of said element providing an inlet and a valve seat thereabout, a second closure fitting for the opposite end of said element providing an outlet and a valve seat thereabout, a pair of valves mounted on a common stem, said stem reciprocable to alternately seat and unseat one of said valves with the inlet valve seat while simultaneously unseating and seating the other valve with said outlet valve seat, a pressure duct to said first fitting from which pressure medium normally holds the outlet valve closed and charges said reservoir with a limited pressure charge, a piston and cylinder device mounted by said second fitting, said piston having a piston rod shiftable by said piston, a helical spring connection between said piston and valve stem to shift said stem in response to movement of said piston, a pressure duct from said reservoir to said second fitting, a manually operable service valve in said duct, said duct supplying pressure means actuable to shift said piston whereby said inlet valve is closed and said outlet valve is opened, and a duct from said second fitting in communication with said outlet to conduct the limited pressure charge from said reservoir to the valve mechanism to be actuated thereby.

6. The structure set forth in claim 5 wherein means are provided to resist the movement of said piston to open said outlet valve, said means operating to shift said piston independently of moving the valve stem.

7. A valve actuator of the class described comprising a cylinder, closure heads for the ends of said cylinder, an inlet valve in one of said heads and an outlet valve in the other, a stem axially disposed in said cylinder and reciprocable to alternately open and close said valves, a piston and cylinder device mounted within one of said heads, a piston rod reciprocable by said piston in alignment with said stem, a spring connection between said piston rod and stem, a pressure supply duct to said inlet, said pressure supply also having a duct to said cylinder, a duct from said outlet valve, and a predetermined control for the pressure supply to said cylinder automatically operable in response to drain from the pressure supply.

8. The structure set forth in claim 7 including a timing exhaust mounted on said piston and cylinder carrying head in direct communication through said head with the duct from the outlet valve.

9. In an automatic blow-off control for a fluid pressure tank, a blow-off valve, a first piston and cylinder device for operating said blow-off valve, a relay, said relay including a reservoir in series with said tank, valve means operable to alternately open and close said reservoir to the tank and to an outlet, a second piston and cylinder device for operating said valve means, a duct connection between said outlet and the first piston and cylinder device, an adjustable timed exhaust for said duct connection, a service controlled pressure supply to said second piston and cylinder device, and a manually operable valve in series with said blow-off valve.

References Cited in the file of this patent

UNITED STATES PATENTS

| | | |
|---|---|---|
| 1,438,317 | Lewis | Dec. 12, 1922 |
| 1,572,185 | Cass | Feb. 9, 1926 |
| 2,192,769 | Dach | Mar. 5, 1940 |
| 2,330,027 | Churchman et al. | Sept. 21, 1943 |
| 2,361,084 | Canetta | Oct. 24, 1944 |
| 2,410,799 | Bassett | Nov. 12, 1946 |
| 2,462,614 | Dewitt | Feb. 22, 1949 |
| 2,509,597 | Hamilton | May 30, 1950 |
| 2,548,236 | Parks | Apr. 10, 1951 |